US011941728B2

(12) United States Patent
Lin et al.

(10) Patent No.: US 11,941,728 B2
(45) Date of Patent: Mar. 26, 2024

(54) PREVIEWING METHOD AND APPARATUS FOR EFFECT APPLICATION, AND DEVICE, AND STORAGE MEDIUM

(71) Applicant: Beijing Bytedance Network Technology Co., Ltd., Beijing (CN)

(72) Inventors: Zhaoqin Lin, Beijing (CN); Pingfei Fu, Beijing (CN); Yan Zeng, Beijing (CN); Qifan Zheng, Beijing (CN); Chen Zhao, Beijing (CN)

(73) Assignee: BEIJING BYTEDANCE NETWORK TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 18/087,667

(22) Filed: Dec. 22, 2022

(65) Prior Publication Data

US 2023/0129509 A1    Apr. 27, 2023

Related U.S. Application Data

(63) Continuation of application No. PCT/CN2021/107816, filed on Jul. 22, 2021.

(30) Foreign Application Priority Data

Jul. 23, 2020  (CN) .......................... 202010718003.4

(51) Int. Cl.
*G06T 11/00*       (2006.01)
(52) U.S. Cl.
CPC .................... *G06T 11/00* (2013.01)

(58) Field of Classification Search
CPC ....................................................... G06T 11/00
See application file for complete search history.

(56) References Cited

U.S. PATENT DOCUMENTS 6,477,315 B1 *  11/2002  Ohomori ................ H04N 5/262
                                                            386/280
9,990,911 B1 *  6/2018  Lee ....................... G06F 16/683
(Continued)

FOREIGN PATENT DOCUMENTS

CN         108022279 A  *  5/2018  ......... G06F 3/04845
CN         108022279 A       5/2018
(Continued)

OTHER PUBLICATIONS

International Search Report and Written Opinion in PCT/CN2021/107816, dated Oct. 20, 2021, 18 pages.
(Continued)

*Primary Examiner* — Yu Chen
(74) *Attorney, Agent, or Firm* — Astute IP Law Group

(57) ABSTRACT

The present disclosure provides an effect application previewing method, an apparatus, a device and a storage medium. The method includes: taking, in response to a preview trigger operation for a target effect style, a position of a pointer on a video track as a start point, to generate a virtual video frame for the target effect style; synchronously playing the virtual video frame and at least one video clip corresponding to the virtual video frame on the video track based on a timeline, to preview an effect of the target effect style applied to the at least one video clip.

14 Claims, 2 Drawing Sheets

(56) References Cited

U.S. PATENT DOCUMENTS

| | | | | |
|---|---|---|---|---|
| 2005/0264669 A1* | 12/2005 | Ota | .................. | H04N 5/262 |
| | | | | 348/333.12 |
| 2010/0281375 A1* | 11/2010 | Pendergast | ............. | G11B 27/34 |
| | | | | 715/723 |
| 2010/0281376 A1* | 11/2010 | Meaney | ................. | G11B 27/34 |
| | | | | 715/730 |
| 2012/0033948 A1* | 2/2012 | Rodriguez | ........... | G11B 27/034 |
| | | | | 386/282 |
| 2017/0352379 A1 | 12/2017 | Oh et al. | | |
| 2021/0390311 A1* | 12/2021 | Barron | ............... | G06K 7/10118 |
| 2022/0319064 A1* | 10/2022 | Yeh | ........................ | G06T 11/00 |
| 2023/0091286 A1* | 3/2023 | Zhao | ............... | H04N 21/43637 |
| | | | | 455/41.2 |

FOREIGN PATENT DOCUMENTS

| | | | |
|---|---|---|---|
| CN | 109379623 A | 2/2019 | |
| CN | 109495791 A | 3/2019 | |
| CN | 110636382 A | 12/2019 | |
| CN | 111756952 A | 10/2020 | |

OTHER PUBLICATIONS

Extended European Search Report in EP21846137.4, dated Oct. 23, 2023, 8 pages.

* cited by examiner

PREVIEWING METHOD AND APPARATUS FOR EFFECT APPLICATION, AND DEVICE, AND STORAGE MEDIUM

The present application is a continuation of International Patent Application No. PCT/CN2021/107816, filed on Jul. 22, 2021, which claims priority of Chinese Patent Application No. 202010718003.4, filed on Jul. 23, 2020, and the entire content disclosed by the Chinese patent application is incorporated herein by reference as part of the present application.

TECHNICAL FIELD

The present disclosure relates to a field of video processing, and more particularly, to an effect application previewing method, an apparatus, a device, and a storage medium.

BACKGROUND

In order to meet diverse needs of users for video processing, various types of effect styles are pre-made, and interactive functions for applying the various types of effect styles to videos are provided for the users to ensure user experience in the process of video processing.

In practical application, in order to ensure the picture effect after the selected effect style is applied to the video, before the effect style is actually applied to the video, the picture to which the effect style is applied to the video is previewed first.

Currently, in a preview function, when an effect style is applied to a video, only the preview function of applying the selected effect style to a certain frame of video is supported. A user cannot know in advance which clip of the entire video the effect style is applied to, nor can know in advance information such as a duration of the effect style in the entire video and the like. Therefore, the current preview function cannot provide the user with a complete preview effect of applying the effect style to the video.

Therefore, how to provide the user with a complete preview effect of applying the selected effect style to the video, so as to help the user make a more accurate effect application selection, thereby improving the user experience, is a technical problem that needs to be solved urgently at present.

SUMMARY

In order to solve the above technical problem or at least partially solve the above technical problem, the present disclosure provides an effect application previewing method, an apparatus, a device, and a storage medium. The effect application previewing method can provide a user with a complete preview effect of applying a selected effect style to a video, and help the user make accurate selection of effect application, thereby improving user experience.

In a first aspect, the present disclosure provides an effect application previewing method, the method includes:
 taking, in response to a preview trigger operation for a target effect style, a position of a pointer on a video track as a start point, to generate a virtual video frame for the target effect style;
 synchronously playing the virtual video frame and at least one video clip corresponding to the virtual video frame on the video track based on a timeline, to preview an effect of the target effect style applied to the at least one video clip.

In an optional embodiment, a length corresponding to the virtual video frame is same as a display duration of the target effect style, or the length corresponding to the virtual video frame is same as a length from the start point to a preset end point.

In an optional embodiment, the method further includes:
 displaying, in response to the preview trigger operation for the target effect style, the target effect style on a video picture being played in the video playing window.

In an optional embodiment, taking, in response to a preview trigger operation for a target effect style, a position of a pointer on a video track as a start point, to generate a virtual video frame for the target effect style, includes:
 taking, in response to the preview trigger operation for the target effect style, the position of the pointer on the video track as the start point, to generate the virtual video frame for the target effect style on a virtual track, and the virtual track has a hierarchical relationship with the at least one video track.

In an optional embodiment, the target effect style comprises an animation-type effect style and a static-type effect style.

In a second aspect, the present disclosure provides an effect application previewing apparatus, the apparatus includes:
 a generation module, configured to take, in response to a preview trigger operation for a target effect style, a position of a pointer on a video track as a start point, to generate a virtual video frame for the target effect style;
 a playing module, configured to synchronously play the virtual video frame and at least one video clip corresponding to the virtual video frame on the video track based on a timeline, to preview an effect of the target effect style applied to the at least one video clip.

In an optional embodiment, the apparatus further includes:
 a displaying module, configured to display, in response to the preview trigger operation for the target effect style, the target effect style on a video picture being played in the video playing window.

In an optional embodiment, the generation module is configured to:
 take, in response to the preview trigger operation for the target effect style, the position of the pointer on the video track as the start point, to generate the virtual video frame for the target effect style on a virtual track, and the virtual track has a hierarchical relationship with the at least one video track.

In a third aspect, the present disclosure provides a computer-readable storage medium, wherein the computer-readable storage medium stores instructions, and the instructions, when run on a terminal device, enables the terminal device to implement the method described above.

In a fourth aspect, the present disclosure provides a device, the device includes a memory, a processor, and a computer program stored on the memory and runnable on the processor, in a case where the processor executes the computer program, the method described above is achieved.

Compared with the prior art, the technical solutions provided by embodiments of the present disclosure have the following advantages:

An embodiment of the present disclosure provides an effect application previewing method. Specifically, when a preview trigger operation for a target effect style is received, a position of a pointer on a video track is taken as a start point to generate a virtual video frame for the target effect style. Then, the virtual video frame and a video clip corresponding to the virtual video frame on the video track are played synchronously based on a timeline, so as to implement a preview of the effect of the target effect style applied to the video clip. The present disclosure adopts the method of generating a virtual video frame for the target effect style and playing the virtual video frame synchronously with the video clip, so as to implement a preview of the complete picture effect of applying the target effect style to the video clip, provide a more realistic preview effect to help the user make a more satisfactory selection when processing video effects, thereby improving user experience.

BRIEF DESCRIPTION OF THE DRAWINGS

The drawings herein are incorporated into and constitute a part of the specification, illustrate embodiments consistent with the disclosure, and together with the specification, serve to explain the principles of the disclosure.

In order to more clearly explain the embodiments of the present disclosure or the technical solutions in the prior art, the following will briefly introduce the drawings that need to be used in the description of the embodiments or the prior art. Obviously, for those of ordinary skill in the art, other drawings can be obtained according to these drawings without paying creative labor.

DETAILED DESCRIPTION

In order to be able to more clearly understand the above objects, features and advantages of the present disclosure, the scheme of the present disclosure will be further described below. It should be noted that the embodiments of the present disclosure and the features in the embodiments can be combined with each other without conflict.

Many specific details are set forth in the following description in order to fully understand the present disclosure, but the present disclosure can also be implemented in other ways different from those described here; Obviously, the embodiments in the specification are only part of the embodiments of this disclosure, but not all of them.

With the increasing requirements of users for video processing, interactive functions for video processing are becoming more and more diversified. For example, before actually applying a certain effect style to a video, the effect style may be first applied to the video to preview an actual screen effect of the video, so as to help a user make a more satisfactory selection, thereby improving user experience.

Currently, the preview function of applying an effect style to a video only supports the effect preview of applying the selected effect style to a certain frame of video but cannot provide a user with a complete preview effect of applying the effect style to a video clip, which is not conducive for the user to make an accurate selection when performing effect processing on the video and reduces the user experience.

To this end, the present disclosure provides an effect application previewing method. Specifically, when receiving a preview trigger operation for a target effect style, taking a position of a pointer on a video track as a start point to generate a virtual video frame for the target effect style. Then, synchronously playing the virtual video frame and a video clip corresponding to the virtual video frame on the video track based on a timeline, so as to implement a preview of the effect of the target effect style applied to the video clip. The present disclosure adopts the method of generating a virtual video frame for the target effect style and playing the virtual video frame synchronously with the video clip, so as to implement a preview of the complete picture effect of applying the target effect style to the video clip, provide a more realistic preview effect to help the user make a more satisfactory selection when processing video effects, to improve user experience.

Figure 1:
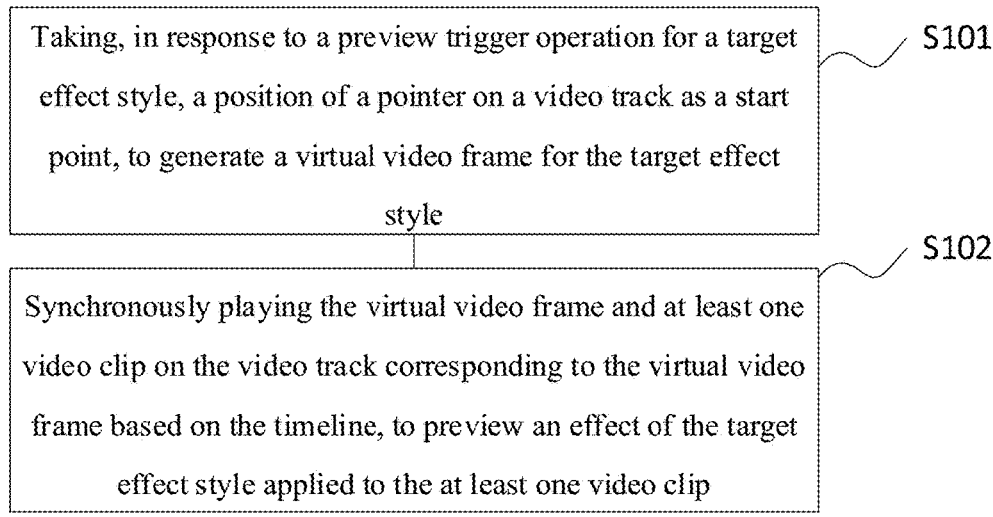
FIG. 1 is a flowchart of an effect application previewing method provided by an embodiment of the present disclosure.

On such basis, an embodiment of the present disclosure provides an effect application previewing method. FIG. 1 is a flowchart of an effect application previewing method provided by the embodiment of the present disclosure. Referring to FIG. 1, the method includes:

S101: taking, in response to a preview trigger operation for a target effect style, a position of a pointer on a video track as a start point to generate a virtual video frame for the target effect style.

In the embodiment of the present disclosure, the target effect style may be any selected effect style, the target effect style may include an animation-type effect style and a static-type effect style. Specifically, the animation-type effect style may include effect styles such as a special effect, a dynamic sticker, and a dynamic text; and the static-type effect style may include effect styles such as a filter, a static special effect, a static sticker, and a static text.

In practical applications, before triggering the preview function, determining an action position of the effect style first, which specifically refers to which clip of the video the selected effect style is applied to. In the embodiment of the present disclosure, the action position of the effect style may be determined through the pointer on the video track.

Figure 2:
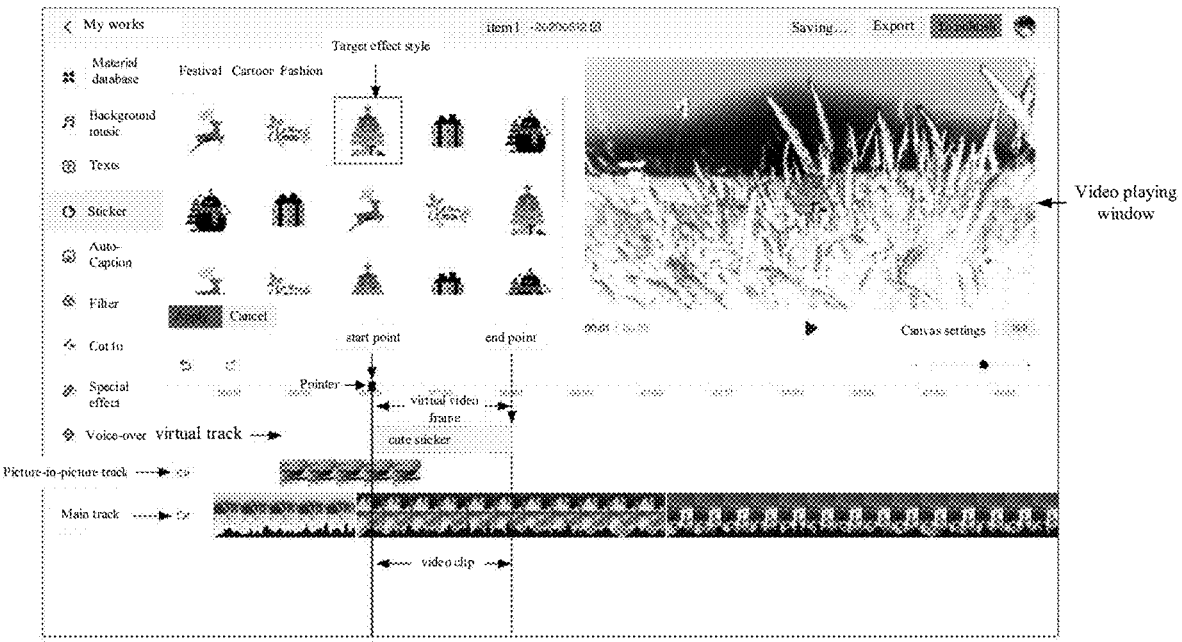
FIG. 2 is a schematic diagram of a video processing interface provided by an embodiment of the present disclosure.

FIG. 2 is a schematic diagram of a video processing interface provided by an embodiment of the present disclosure. Referring to FIG. 2, a user may determine the action position of the effect style by moving the position of the pointer on the video track. After determining the position of the pointer on the video track, determining a target effect style by clicking at least one of a plurality of effect styles displayed on the interface, and a preview operation of applying the target effect style to the position of the pointer is triggered at the same time.

In an optional embodiment, after determining the target effect style and the position of the pointer on the video track, a preview operation of applying the target effect style to the position of the pointer may be triggered through a preset preview button.

In the embodiment of the present disclosure, after receiving the preview trigger operation for the target effect style, taking the position of the pointer on the video track as the start point to generate a virtual video frame for the target effect style. As shown in FIG. 2, on the video track, close to the right of the position of the pointer, a virtual video frame, also referred to as a virtual frame, is generated for the target effect style.

In an optional embodiment, a length of the virtual video frame may be the same as a display duration of the target effect style. For example, an animation-type effect style usually has a display duration parameter, such as a certain animation with a display duration of 1 second. At this time, the virtual video frame is a continuous frame with the position of the pointer on the video track as the start point and the display duration of the target effect style as the length.

In another optional embodiment, the length of the virtual video frame may be the same as a length from the start point to a preset end point. Before triggering the preview operation, an end point corresponding to the start point of positioned by the pointer is predetermined as the end point of the virtual video frame. When a preview trigger operation for the target effect style is received, a virtual video frame for the target effect style is generated between the start point positioned by the pointer and the preset end point.

In practical applications, for the static-type effect style, the length of the virtual video frame is usually determined based on the length from the start point to the preset end point. For example, the length corresponding to the virtual video frame is the same as the length from the start point to the preset end point. For the animation-type effect style, any one of the above methods may be used to determine the length corresponding to the virtual video frame.

In an optional embodiment, when receiving a preview trigger operation for the target effect style, in the embodiment of the present disclosure, not only generating a virtual video frame for the target effect style, but also may the target effect style be displayed on a video picture being played in a video playing window. By statically applying the target effect style to the preview effect of the video picture positioned by the pointer, a preliminary preview experience is provided for the user. As shown in FIG. 2, a target effect style is statically displayed on the video picture (e.g., the picture shown in the video playing window in FIG. 2) in the video playing window at the upper right of the video processing interface.

In addition, a video may include a plurality of video tracks, such as a main track, a picture-in-picture track, etc. In order to reflect a hierarchical relationship between the target effect style and a video picture on each video track, the embodiment of the present disclosure may reflect the hierarchical relationship between the target effect style and the video picture on each video track by determining a hierarchical relationship between the virtual track and each video track, and generating a virtual video frame for the target effect style on the virtual track.

As shown in FIG. 2, the virtual track corresponding to the virtual video frame is located on an upper layer of the picture-in-picture track and the main track, which clearly reflects the hierarchical relationship between the target effect style on the virtual track and the video picture on each video track. For example, the virtual track is on the first layer, the picture-in-picture track is on the second layer, and the main track is on the third layer. The first layer may block the pictures of the second layer and the third layer, and the second layer may block the picture of the third layer.

S102: synchronously playing the virtual video frame and a video clip corresponding to the virtual video frame on the video track based on a timeline, to preview an effect of the target effect style applied to the video clip.

In the embodiment of the present disclosure, after generating the virtual video frame, a synchronous playback of the virtual video frame and a video clip corresponding to the virtual video frame on the video track based on the timeline is automatically triggered. By playing the virtual video frame and the video clip synchronously, the user may be provided with a preview of the overall effect of applying the target effect style to the video clip.

In practical applications, after generating the virtual video frame, determining a video clip corresponding to the virtual video frame, the video clip includes video frames on each video track having the same time information as the virtual video frame. As shown in FIG. 2, the video clip corresponding to the virtual video frame includes video frames on each video track between the start point and the end point.

In the effect application previewing method provided by the present disclosure, when receiving a preview trigger operation for a target effect style, taking a position of a pointer on a video track as a start point to generate a virtual video frame for the target effect style. Then, synchronously playing the virtual video frame and a video clip corresponding to the virtual video frame on the video track based on the timeline, so as to implement a preview of the effect of the target effect style applied to the video clip. The embodiment of the present disclosure implements a preview of the complete picture effect of applying the target effect style to the video clip by generating a virtual video frame for the target effect style and playing the virtual video frame synchronously with the video clip, provides a more realistic preview effect to help the user make a more satisfactory selection when processing video effects, thereby improving the user experience.

Figure 3:
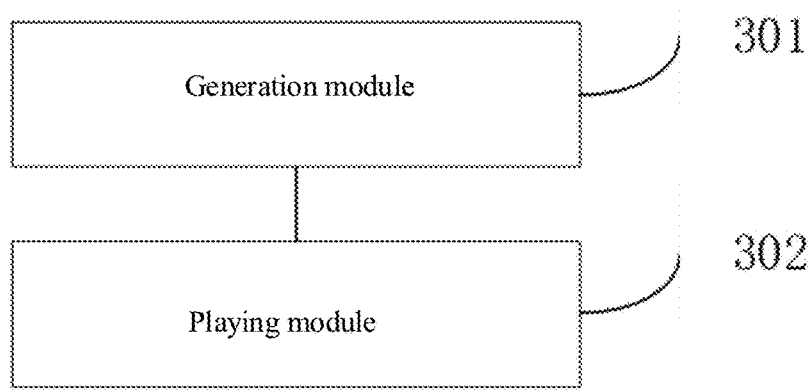
FIG. 3 is a schematic structural diagram of an effect application previewing apparatus provided by an embodiment of the present disclosure.

Belonging to a same inventive concept as the above-mentioned method embodiment, an embodiment of the present disclosure further provides an effect application previewing apparatus. FIG. 3 is a schematic structural diagram of an effect application previewing apparatus provided by the embodiment of the present disclosure. Referring to FIG. 3, the apparatus includes:

a generation module 301, configured to take, in response to a preview trigger operation for a target effect style, a position of a pointer on a video track as a start point, to generate a virtual video frame for the target effect style;

a playing module 302, configured to synchronously play the virtual video frame and a video clip corresponding to the virtual video frame on the video track based on a timeline, to preview an effect of the target effect style applied to the video clip.

In an optional embodiment, the apparatus further includes:

a displaying module, configured to display, in response to the preview trigger operation for the target effect style, the target effect style on a video picture being played in the video playing window.

In an optional embodiment, the generation module is configured to:

take, in response to the preview trigger operation for the target effect style, the position of the pointer on the video track as the start point, to generate the virtual video frame for the target effect style on a virtual track, and the virtual track has a hierarchical relationship with respective video track.

In an optional embodiment, the target effect style includes an animation-type effect style and a static-type effect style.

In an optional embodiment, a length corresponding to the virtual video frame is the same as a display duration of the target effect style, or the length corresponding to the virtual video frame is the same as a length from the start point to a preset end point.

In the effect application previewing apparatus provided by the present disclosure, when receiving a preview trigger operation for a target effect style, taking a position of a pointer on a video track as a start point to generate a virtual video frame for the target effect style. Then, synchronously playing the virtual video frame and a video clip corresponding to the virtual video frame on the video track based on the timeline, so as to implement a preview of the effect of the target effect style applied to the video clip. The embodiment of the present disclosure implements a preview of the complete picture effect of applying the target effect style to the video clip by generating a virtual video frame for the target effect style and playing the virtual video frame synchronously with the video clip, provides a more realistic preview effect to help the user make a more satisfactory selection when processing video effects, thereby improving the user experience.

Figure 4:
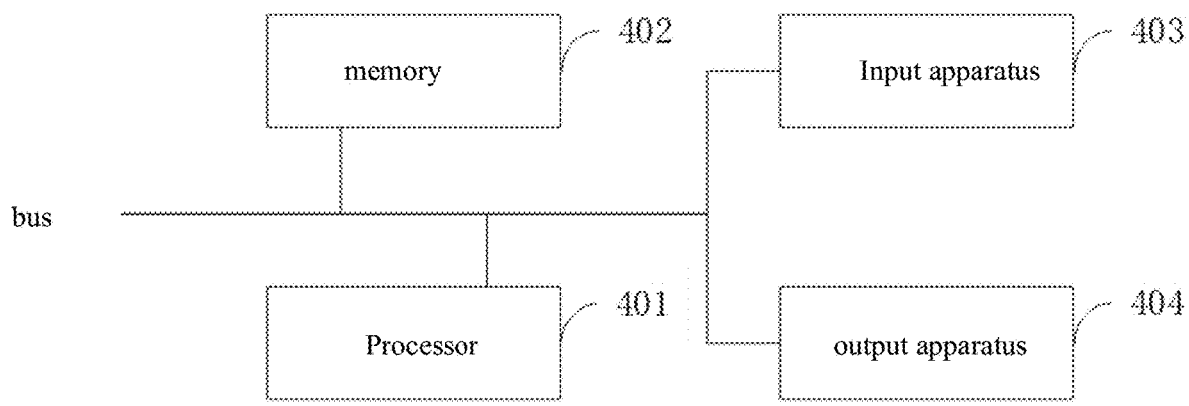
FIG. 4 is a schematic structural diagram of an effect application previewing device provided by an embodiment of the present disclosure.

In addition, an embodiment of the present disclosure further provides an effect application previewing device. As shown in FIG. 4, the effect application previewing device may include:

a processor 401, a memory 402, an input apparatus 403, and an output apparatus 404. The number of processors 401 in the effect application previewing device may be one or more, taking one processor as an example in FIG. 4. In some embodiments of the present disclosure, the processor 401, the memory 402, the input apparatus 403 and the output apparatus 404 may be connected by a bus or other means, taking connection by a bus as an example in FIG. 4.

The memory 402 may be configured to store software program and module; and the processor 401 may execute various functional applications and data processing of the effect application previewing device by running the software program and the module stored in the memory 402. The memory 402 may mainly include a program storage region and a data storage region, the program storage region may store an operating system, an application required for at least one function, etc. In addition, the memory 402 may include a high-speed random access memory, and may also include a nonvolatile memory, for example, at least one disk storage device, a flash memory, or other volatile solid-state storage device. The input apparatus 403 may be configured to receive input digital or character information and generate signal inputs related to user setting and function control of the effect application previewing device.

Specifically, in this embodiment, the processor 401 will load executable files corresponding to the processes of one or more applications into the memory 402 according to instructions below, and the processor 401 may run the applications stored in the memory 402, thereby implementing various functions of the effect application previewing device as described above.

It should be noted that in this specification, relational terms such as "first" and "second" are only used to distinguish one entity or operation from another entity or operation, without necessarily requiring or implying any such actual relationship or sequence between these entities or operations. Moreover, the term "include", "comprise" or any other variation thereof is intended to cover non-exclusive inclusion, so that a process, method, article or equipment that includes a series of elements not only includes those elements, but also includes other elements not explicitly listed, or also includes elements inherent to such process, method, article or equipment. Without further restrictions, the element defined by the statement "including one . . . " does not exclude the existence of another identical element in the process, method, article or equipment that includes the said element.

The above are only specific embodiments of the present disclosure to enable those skilled in the art to understand or realize the present disclosure. Many modifications to these embodiments will be obvious to those skilled in the art, and the general principles defined herein can be implemented in other embodiments without departing from the spirit or scope of this disclosure. Therefore, the present disclosure will not be limited to the embodiments described herein but will be accorded the widest scope consistent with the principles and novel features disclosed herein.

What is claimed:

1. An effect application previewing method, comprising:
    taking, in response to a preview trigger operation for a target effect style, a position of a pointer on a video track as a start point, to generate a virtual video frame for the target effect style; and
    synchronously playing the virtual video frame and at least one video clip corresponding to the virtual video frame on the video track based on a timeline, to preview an effect of the target effect style applied to the at least one video clip;
    wherein the taking, in response to the preview trigger operation for the target effect style, the position of the pointer on the video track as the start point, to generate the virtual video frame for the target effect style, comprises:
    taking, in response to the preview trigger operation for the target effect style, the position of the pointer on the video track as the start point, to generate the virtual video frame for the target effect style on a virtual track, wherein the virtual track has a hierarchical relationship with the at least one video track, and
    wherein the virtual track is located on an upper layer than each video track of the at least one video track, and pictures of the virtual track block pictures of each video track of the at least one video track.

2. The method according to claim 1, wherein a length corresponding to the virtual video frame is same as a display duration of the target effect style, or the length corresponding to the virtual video frame is same as a length from the start point to a preset end point.

3. The method according to claim 2, wherein the taking, in response to a preview trigger operation for a target effect style, a position of a pointer on a video track as a start point, to generate a virtual video frame for the target effect style, comprises:
    taking, in response to the preview trigger operation for the target effect style, the position of the pointer on the video track as the start point, to generate the virtual video frame for the target effect style on a virtual track, wherein the virtual track has a hierarchical relationship with the at least one video tracks.

4. The method according to claim 1, wherein the target effect style comprises an animation-type effect style and a static-type effect style.

5. The method according to claim 1, further comprising:
    displaying, in response to the preview trigger operation for the target effect style, the target effect style on a video picture being played in a video playing window.

6. The method according to claim 1, further comprising:
    displaying, in response to the preview trigger operation for the target effect style, the target effect style on a video picture being played in a video playing window.

7. An effect application previewing apparatus, comprising:
    a generation module, configured to take, in response to a preview trigger operation for a target effect style, a position of a pointer on a video track as a start point, to generate a virtual video frame for the target effect style; and
    a playing module, configured to synchronously play the virtual video frame and at least one video clip corresponding to the virtual video frame on the video track based on a timeline, to preview an effect of the target effect style applied to the at least one video clip, wherein the generation module is configured to:

take, in response to the preview trigger operation for the target effect style, the position of the pointer on the video track as the start point, to generate the virtual video frame for the target effect style on a virtual track, wherein the virtual track has a hierarchical relationship with the at least one video track, and wherein the virtual track is located on an upper layer than each video track of the at least one video track, and pictures of the virtual track block pictures of each video track of the at least one video track.

8. The apparatus according to claim 7, further comprising:
a displaying module, configured to display, in response to the preview trigger operation for the target effect style, the target effect style on a video picture being played in a video playing window.

9. The apparatus according to claim 1, further comprising:
a displaying module, configured to display, in response to the preview trigger operation for the target effect style, the target effect style on a video picture being played in a video playing window.

10. The apparatus according to claim 7, wherein a length corresponding to the virtual video frame is same as a display duration of the target effect style, or the length corresponding to the virtual video frame is same as a length from the start point to a preset end point.

11. The apparatus according to claim 7, wherein the target effect style comprises an animation-type effect style and a static-type effect style.

12. A non-transitory computer-readable storage medium, wherein instructions are stored in the non-transitory computer-readable storage medium, and when the instructions are run on a terminal device, the terminal device is enabled to implement an effect application previewing method, wherein the effect application previewing method comprises:

taking, in response to a preview trigger operation for a target effect style, a position of a pointer on a video track as a start point, to generate a virtual video frame for the target effect style; and synchronously playing the virtual video frame and at least one video clip corresponding to the virtual video frame on the video track based on a timeline, to preview an effect of the target effect style applied to the at least one video clip;

wherein the taking, in response to the preview trigger operation for the target effect style, the position of the pointer on the video track as the start point, to generate the virtual video frame for the target effect style, comprises:

taking, in response to the preview trigger operation for the target effect style, the position of the pointer on the video track as the start point, to generate the virtual video frame for the target effect style on a virtual track, wherein the virtual track has a hierarchical relationship with the at least one video track, and wherein the virtual track is located on an upper layer than each video track of the at least one video track, and pictures of the virtual track block pictures of each video track of the at least one video track.

13. A device, comprising: a memory, a processor, and a computer program stored in the memory and run on the processor, wherein upon executing the computer program, the method according to claim 1 is achieved by the processor.

14. A device, comprising: a memory, a processor, and a computer program stored in the memory and run on the processor, wherein upon executing the computer program, the method according to claim 2 is achieved by the processor.

* * * * *